(12) United States Patent
Fornero et al.

(10) Patent No.: US 12,497,056 B2
(45) Date of Patent: Dec. 16, 2025

(54) SENSOR SYNCHRONIZATION SYSTEM

(71) Applicant: GM CRUISE HOLDINGS LLC, San Francisco, CA (US)

(72) Inventors: Matthew Fornero, Berkeley, CA (US); Gregory Kehoe, Redwood City, CA (US); Joshua Leighton, Berkeley, CA (US); Shane McGuire, Antioch, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 480 days.

(21) Appl. No.: 17/952,413

(22) Filed: Sep. 26, 2022

(65) Prior Publication Data

US 2024/0101129 A1 Mar. 28, 2024

(51) Int. Cl.
*B60W 50/02* (2012.01)
*B60W 50/00* (2006.01)

(52) U.S. Cl.
CPC . *B60W 50/0205* (2013.01); *B60W 2050/0083* (2013.01); *B60W 2420/40* (2013.01); *B60W 2420/408* (2024.01); *B60W 2420/54* (2013.01); *B60W 2556/35* (2020.02)

(58) Field of Classification Search
CPC .. B60W 50/00; B60W 50/02; B60W 50/0205; B60W 2050/0083; B60W 2420/40; B60W 2420/408; B60W 2420/54; B60W 2556/35

See application file for complete search history.

(56) References Cited

U.S. PATENT DOCUMENTS

| | | | |
|---|---|---|---|
| 10,523,880 B2 | 12/2019 | Gassend et al. | |
| 10,999,511 B2 | 5/2021 | Yang et al. | |
| 2019/0098233 A1* | 3/2019 | Gassend | H04N 23/73 |
| 2021/0239812 A1* | 8/2021 | Meng | G05B 19/0426 |
| 2023/0305138 A1* | 9/2023 | Zhou | H04L 12/12 |

OTHER PUBLICATIONS

Nikolic, Janosch et al., "A synchronized visual-inertial sensor system with FPGA pre-processing for accurate real-time SLAM," 2014 IEEE International Conference on Robotics & Automation (ICRA), Hong Kong Convention and Exhibition Center (Year: 2014).*

* cited by examiner

*Primary Examiner* — Andrew Schechter
*Assistant Examiner* — Ethan Wesley Edwards
(74) *Attorney, Agent, or Firm* — CANTOR COLBURN LLP

(57) ABSTRACT

Disclosed are systems and methods for a sensor synchronization system. Sensors of an autonomous vehicle (AV) are synchronized to cause sampling of a first sensor of the sensors to occur in alignment with sampling of a second sensor of the sensors. A sampling time point for the first sensor is determined based on the synchronizing the sensors, the sampling time point comprising a time when the first sensor is in alignment with the second sensor. The sampling time point is provided to the first sensor. A controller circuit of the first sensor determines an offset of the first sensor to apply to a local system time of the first sensor to cause a data acquisition of the first sensor to occur at the sampling time point. The data acquisition is performed at the first sensor using the sampling time point and the offset.

20 Claims, 8 Drawing Sheets

SENSOR SYNCHRONIZATION SYSTEM

BACKGROUND

1. Technical Field

The disclosure generally relates to the field of autonomous vehicles and, more specifically, a sensor synchronization system for autonomous vehicles.

2. Introduction

An autonomous vehicle is a motorized vehicle that can navigate without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the disclosed technology will become apparent by reference to specific implementations illustrated in the appended drawings. A person of ordinary skill in the art will understand that these drawings only show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which.

DETAILED DESCRIPTION

Figure 1:
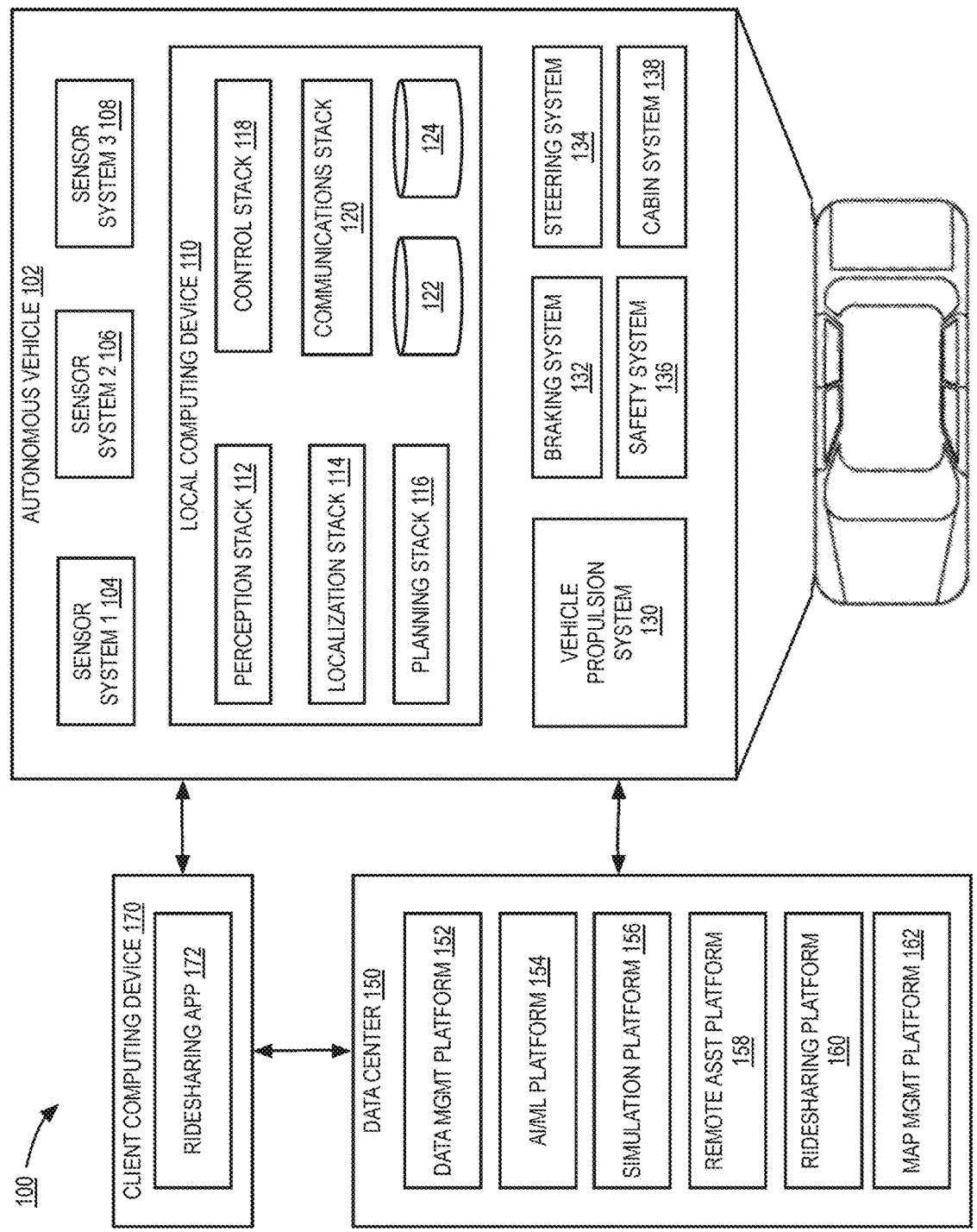
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs) can be implemented by companies to provide self-driving car services for the public, such as taxi or ride-haling (e.g., ride-sharing) services. The AV can navigate about roadways without a human driver based upon sensor signals output by sensor systems deployed on the AV. The sensor systems (which may refer to a set of sensors, individual sensors, or AV sensors) can be of different types (modalities) and are arranged about the AV in different locations and positions. For example, a first sensor system may be a camera sensor system and an Nth sensor system may be a Light Detection and Ranging (LIDAR) sensor to perform ranging measurements for localization. Other example sensor systems include radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers such as Global Positioning System (GPS) receivers, accelerometers, gyroscopes, inertial measurement units (IMU), infrared sensors, laser rangefinders, ultrasonic sensors, infrasonic sensors, microphones, or a combination thereof. Furthermore, some or all of the sensor systems may be articulating sensors that can be oriented/rotated such that a field of view (FoV) of the articulating sensors is directed towards different regions surrounding the AV.

In order to navigate the surroundings of the AV, the AV seeks to combine (e.g., fuse) the data (i.e., samples) captured by the different sensors into an accurate holistic representation. In order to do so, the AV should synchronize the sampling of those different sensors. However, different sensor modalities may have different intrinsic properties, such as different triggering mechanisms, different sampling periods/patterns, different fields of view, and/or different intrinsic latencies. For example, a common type of automotive LIDAR is constructed as a spinning device that mechanically rotates around a 360-degree FoV, and may take, for example, 10-100 milliseconds (ms) to complete a full rotation. Compared to LIDAR, cameras and flash LIDAR obtain samples in a smaller moment of time and with a limited physical FoV (e.g., 30 degree FoV). Cameras have exposure time and may use a rolling shutter, both of which introduce additional sampling delay. For example, exposure may introduce 5-10 ms of delay while a rolling shutter can introduce another 20-30 ms, unevenly across the image.

One approach to synchronizing sensors of different modalities is to trigger each sensor at the same time. However, this approach does not correct for the aforementioned intrinsic properties of the different sensors. As a result, this approach generates sampling offsets, which can cause "blur" or "offsets" in the fused view of the world. Another approach is to correct for "offset" later in a perception pipeline of the AV. However, this approach is resource-intensive and limits the achievable accuracy.

Embodiments herein provide for precisely synchronizing sensors of different modalities to a common time base. In one embodiment, a global sampling point is determined for one or more sensors of an AV based on extrinsic properties (e.g., physical mounting angle, etc.) of the sensors. In embodiments herein, the global sampling point aligns (e.g., spatially and temporally) sampling of the sensor systems with a primary sensor of the AV. For example, the global sampling point for a camera sensor of the AV may synchronize the data capture time of the camera sensor with the data capture time of a spinning LIDAR sensor of the AV when the camera sensor and the LIDAR sensor are aligned spatially. In one embodiment, the global sampling point is provided based on a common time base established across the sensor systems of the AV.

Although some embodiments are described as synchronizing with a primary sensor of the AV, embodiments herein may be applicable to an AV that does not utilize a primary sensor, but rather multiple groups of synchronized sensors. Embodiments herein are applicable to various implementations of synchronization of sensor systems, and not solely limited to synchronization with a primary sensor system. Discussion of utilization of a primary sensor for synchronization is provided as an example embodiment herein for ease of explanation, and embodiments may be applicable to implementations that utilize multiple groups of synchronized sensors.

Having determined the global sampling point for the sensor systems relative to the primary sensor of the AV, embodiments herein further utilize the individual sensors to determine offset values corresponding to the particular sensors. The offset value (also referred to herein as an offset) is applied at the sensor to cause an acquisition process of the sensor to initiate so that the actual capturing of the sensor sample can occur at the global sampling point identified for the sensor. The offset can be determined based on intrinsic properties of the sensor, such as different triggering mechanisms, different sampling periods/patterns, and/or different intrinsic latencies. This allows for precise synchronization of the sensor to the global sampling point of the sensor systems. Further details of the sensor synchronization system of embodiments herein are further described below with respect to FIGS. 1-7.

Turning now to FIG. 1, this figure illustrates an example of an AV management system 100. In one embodiment, the AV management system 100 can implement a sensor synchronization system to precisely synchronize sensors of different modalities to a common time base, as described further herein. One of ordinary skill in the art will understand that, for the AV management system 100 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Figure 2:
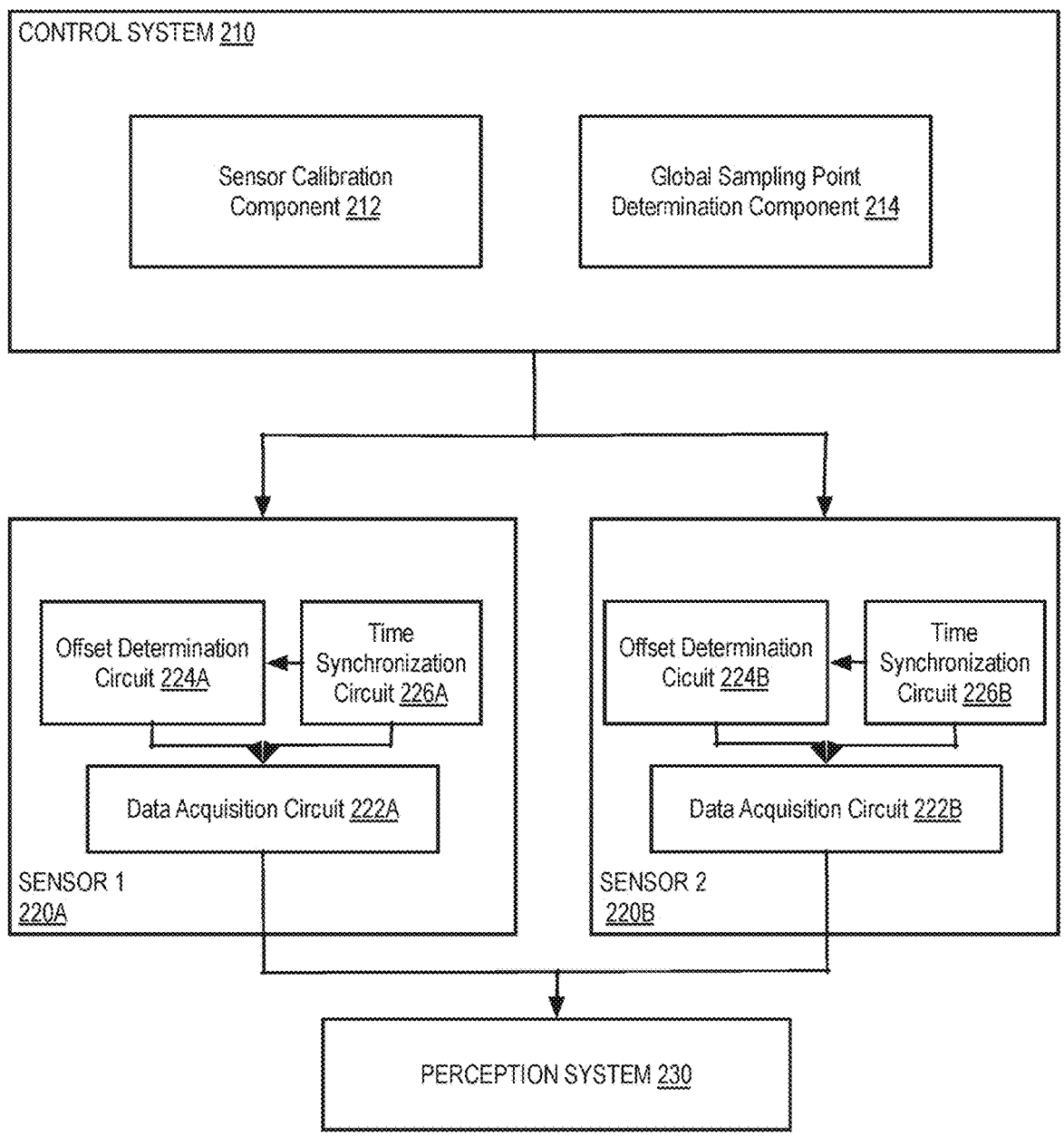
FIG. 2 illustrates a functional block diagram for operations of a vehicle, in accordance with an embodiment herein.

FIG. 2 illustrates a functional block diagram for operations of a vehicle 200 (e.g., an autonomous vehicle (AV), which in some embodiments is fully autonomous while in other embodiments is a driver-assisted vehicle, etc.) in accordance with an embodiment herein. In one embodiment, vehicle 200 is the same as AV 102 described with respect to FIG. 1. The vehicle 200 can include a control system 210, one or more sensor systems 220A-220B, and a perception system 230. In embodiments herein, the vehicle 200 can utilize control system 210, sensor systems 220A-220B, and perception system 230 to implement a sensor synchronization system to precisely synchronize sensor systems 220A-220B of different modalities using a common synchronized time base.

In one embodiment, the sensor systems 220A-220B may be the same as sensor systems 104-108 described with respect to FIG. 1. Sensor systems 220A-220B can include different types of sensors and can be arranged about the vehicle 200. For instance, the sensor systems 220A-220B can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor 1 220A can be a LIDAR system (e.g., primary sensor) and the sensor 2 220B can be a camera system (e.g., secondary sensor). Other embodiments may include any other number and type of sensors.

The control system 210 can include a sensor calibration component 212 to perform calibration of the sensor systems 220A-220B of vehicle 200. The calibration process can determine the transformations between the sensor systems 220A-220B and the vehicle 200. These transformations can be estimated up to a high degree of accuracy, e.g., within a few millimeters and milliradians. In one embodiment, the calibration process can determine the "extrinsics" of the sensor systems with a high degree of accuracy. The "extrinsics" or "extrinsic properties" may refer to the external physical properties of the sensor systems 220A-220B, such as positioning of the sensor systems on the vehicle 200, e.g., physical mounting angle, etc. In addition, the calibration process can also recover the "intrinsics" or "intrinsic properties" of the sensors. The "intrinsics" or "intrinsic properties" may refer to the internal physical properties of the sensor systems 220A-220B, such as the lens distortion of the cameras, bias in the accelerometer and gyroscope of the IMU, etc. The extrinsics and intrinsics identified during the calibration process may be referred to as calibration parameters, which are an input to perception, mapping, localization, and control modules on the AV.

Based on the calibration process, the sensor calibration component 212 can provide calibration parameters to the global sampling point determination component 214 of the control system 210. The global sampling point determination component 214 may calculate a global sampling point for each sensor of sensor systems 220A-220B based on the extrinsic properties of the sensors systems 220A-220B of the vehicle 200. In one embodiment, the global sampling point determination component 214 may align sampling of each sensor of sensor systems 220A-220B with a primary sensor, such as sensor system 1 220A (also referred to herein as a second sensor system) of the vehicle 200. For example, the global sampling point determination component 214 may align global sampling points of other sensors, such as sensor 2 220B, with a spinning LIDAR sensor 220A of the vehicle 200. In the example previously discussed, the global sampling point determination component 214 may determine a global sampling point of a camera sensor, such as sensor 2 220B, so that the camera sensor 220B can acquire a sample when it is aligned (e.g., spatially) with the spinning LIDAR, such as sensor 1 220A. In one embodiment, the global sampling point is provided based on a common time base established across all of the sensor systems 220A-220B.

Having determined the global sampling point for the other sensor systems 220B relative to a primary sensor 220A (e.g., LIDAR system) of the vehicle 200, implementations herein further utilize distributed components of a sensor synchronization system of vehicle 200 to determine an offset for each of the remaining sensor systems 220A-220B (also referred to herein as first sensor systems). In some embodiments, the distributed components may include logic, such as controller circuitry, configured in one or more of the sensor systems 220A-220B.

In one embodiment, the offset (offset value) is applied at the sensor system 220A-220B to cause an acquisition process of the sensor system 220A-220B to initiate so that the actual capturing of the sensor sample can occur at the global sampling point identified for the sensor system 220A-220B. This allows for precise synchronization of the individual sensors of sensor systems 220A-220B to the global sampling point of the sensor systems 220A-220B.

In one embodiment, sensor systems 220A-220B can include a data acquisition circuit 222A-222B, an offset determination circuit 224A-224B, and a time synchronization circuit 226A-226B. The offset determination circuit 224A-224B accounts for the intrinsic properties particular to the individual sensor system 220A-220B in order to correct the global sampling point for the individual sensors of sensor systems 220A-220B. The time synchronization circuit 226A-226B enables a common and accurate time base to be implemented across the sensor systems 220A-220B. Further details of the time synchronization circuit 226A-226B are described below with respect to FIG. 4.

In embodiments herein, the global sampling point and determined offset are provided to the data acquisition circuitry 222A-222B in order to cause a data sample to be captured at the global sampling point in synchronization with another sensor 220A-220B that is configured as the primary sensor for synchronization purposes. The data acquisition circuit 222A-222B causes the acquisition process to initiate (e.g., trigger) at a time that is determined by applying the offset to the global sampling point. In embodiments herein, the trigger time is precisely synchronized to a common time base that applies across all sensor systems 220A-220B of the vehicle 200. As a result, data samples captured by sensor systems 220A-220B are fully aligned both temporally and spatially with the primary sensor system when such data samples are passed on to the perception system 230. The perception system 230 can then perform fusion on the data samples received from multiple sensor systems 220A-220B of the vehicle 200 with a high degree of alignment and a minimization of error.

As noted above, in embodiments herein, the offset determination circuit 224A-224B can account for the intrinsic properties of the sensor 220A-220B to determine the offset value. For example, if sensor 220B is a camera sensor system, offset determination circuit 224B may identify the intrinsic properties accounted to shutter timing, rolling shutter architecture, and/or variable exposure of the camera system. In one embodiment, such intrinsic properties may be identified as part of the calibration process performed by sensor calibration component 212 of control system 210. Based on the intrinsic properties, the offset determination circuit 224A-224B may determine the offset value. The offset value may include an amount of time to correct the global sampling point provided to the sensor 220A-220B. In one embodiment, the correction of the actual global sampling point with the offset value can result in an earlier trigger time of the data acquisition process (as compared to the global sampling point). This allows for the actual data acquisition of the sensor 220A-220B to occur at the global sampling point.

Figure 3A:
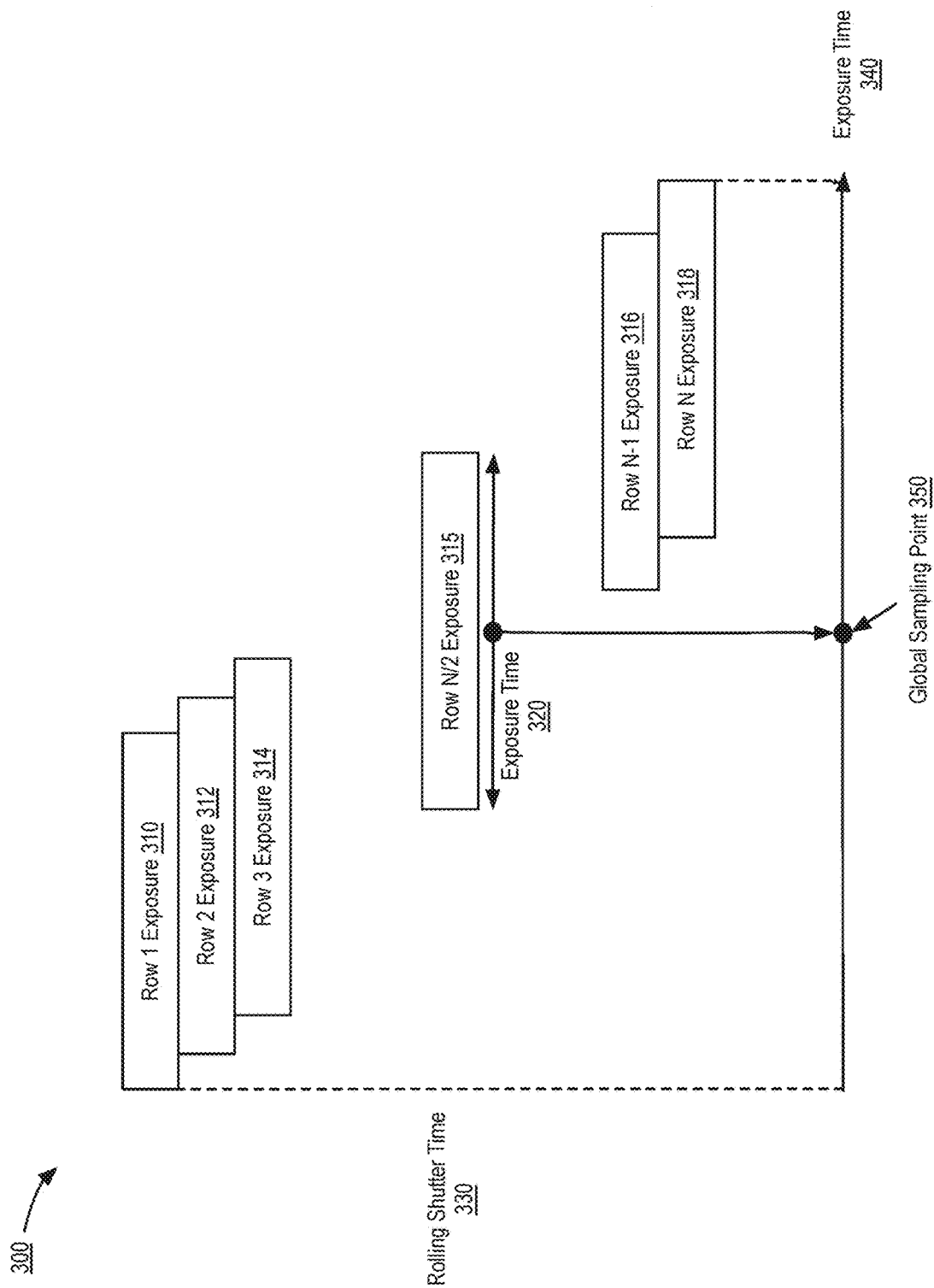
FIG. 3A illustrates an example graphical representation of the intrinsic properties of rolling shutter time and exposure in a camera sensor, according to some examples of the disclosure.
Figure 3B:
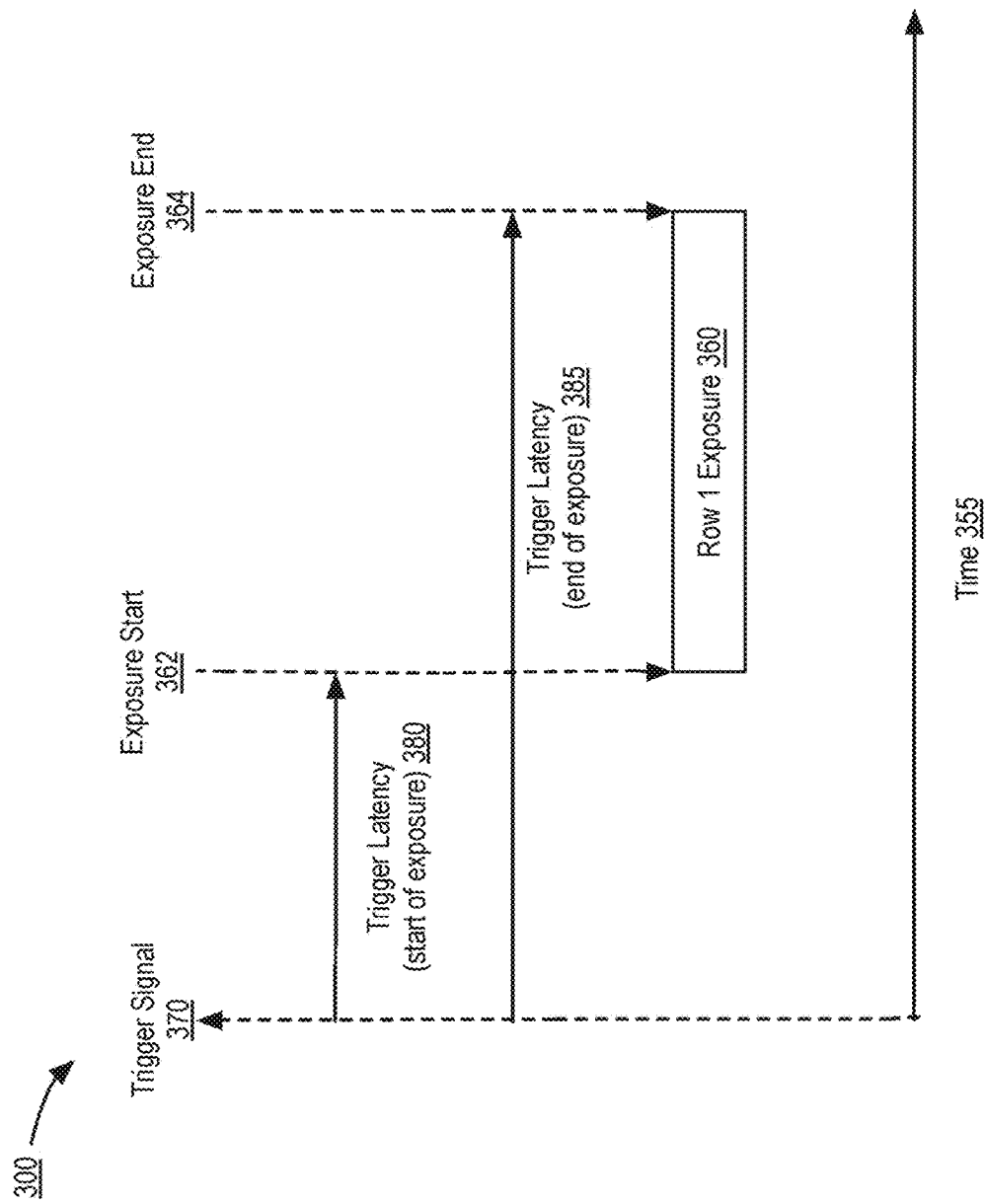
FIG. 3B illustrates an example graphical representation of the intrinsic trigger signal latency in a camera sensor, according to some examples of the disclosure.

FIGS. 3A and 3B detail example intrinsic properties of a camera sensor and their effects on a global sampling point, in accordance with an embodiment herein. As noted above, in the example use case of a camera sensor, the intrinsic properties of the camera sensor can include rolling shutter latency and exposure latency. A rolling shutter refers to exposing each row of the camera's FoV sequentially (instead of exposing the entire camera FoV instantaneously). In some embodiments, the LIDAR scan may sweep horizontally across the camera's FoV, while the rolling shutter sweeps vertically. Exposure refers to the duration of time the camera is exposed to its scene. For some cameras, the duration of exposure is fixed, while in other cameras an auto-exposure can be utilized to dynamically adjust the exposure time based on an amount of ambient light (with minimum and maximum duration limits).

FIG. 3A illustrates an example graphical representation of the intrinsic properties of rolling shutter time and exposure in a camera sensor 300, in accordance with embodiments herein. As shown in the graphical representation, the camera sensor 300 may utilize a rolling shutter that sweeps vertically through the rows of the camera sensor's 300 FoV. As such, the rolling shutter time 330 is shown along the Y-axis, while the exposure time 340 is shown along the X-axis of the graphical representation. Assuming N rows of the camera sensor's 300 FoV, the individual exposure time of each row is shown as Row 1 exposure 310 through Row N exposure 318 (including Row 1 exposure 310, Row 2 exposure 312, Row 3 exposure 314, . . . , Row N/2 exposure 315, . . . , Row N−1 exposure 316, and Row N exposure 318).

As noted above, in some embodiments, the LIDAR scan may sweep horizontally across the camera's FoV, while the rolling shutter sweeps vertically. In one embodiment, in order to minimize the worst-case error between the camera and the LIDAR sensor, the sensor synchronization system, via offset determination circuit 224A-224B of FIG. 2, may determine that the provided global sampling point 350 should occur half-way through the rolling shutter time 330. Furthermore, to minimize the error caused by non-instantaneous exposure, the sensor synchronization system, via offset determination circuit 224A-224B of FIG. 2, may determine that the global sampling point 350 should additionally occur half-way through the exposure time 320 of the row that is halfway through the rolling shutter time 330, e.g., Row N/2 of the camera's FoV. In one embodiment, for cameras with auto-exposure, the offset determination circuit 224A-224B can define the exposure duration as shown in the example, where 't' refers to exposure time:

$$\frac{t_{min} + t_{max}}{2},$$

where tmin is the minimum exposure time and tmax is the maximum exposure time.

Combining the above, offset determination circuit 224A-224B may identify that the global sampling point 350 should occur half-way through the rolling shutter time 330 (e.g., Row N/2 of the FoV) and half-way through the exposure time 320 of Row N/2 exposure 315, as shown in the graphical representation depicted in FIG. 3A.

Having defined the point where the global sampling point 350 should occur within the camera sensor 300, the offset determination circuit 224A-224B can then determine when to trigger the signal (referred to herein as a trigger signal) to initiate the data sample acquisition process of the camera to achieve the global sampling point.

FIG. 3B illustrates an example graphical representation of the intrinsic trigger signal latency in a camera sensor 300, in accordance with embodiments. In one embodiment, camera sensor 300 of FIG. 3B is the same as camera sensor 300 of FIG. 3A. As shown in FIG. 3B, camera sensor 300 incurs an amount of latency (in terms of time 355) from when the trigger signal 370 is generated to when the actual exposure starts 362 of Row 1 360 of the FoV of the camera sensor 300. In some camera sensors, there may be a fixed amount of latency 380 from when the trigger signal 370 is sent to when the exposure starts 362. In other camera systems, there may be a fixed amount of latency 385 from when the trigger signal 370 is sent to when the exposure ends 364.

In accordance with the above, in one embodiment, an offset determination circuit (e.g., offset determination circuit 224A-224B of FIG. 2) can calculate an offset for the trigger time as shown below. Assume the following variables are defined:

Tsamp: global sampling point (seconds)
Ttrig: Trigger signal time (seconds)
Tshutter: Rolling shutter duration (seconds)
Texposure: Exposure duration (seconds)
Ttriglatency: Trigger latency (seconds)

For a camera sensor with a fixed latency 380 to the start of exposure 362, the trigger signal time can be determined, for example, as follows:

$$T_{trig} = T_{samp} - T_{triglatency} - \frac{T_{shutter}}{2} - \frac{T_{exposure}}{2}$$

For a camera sensor with a fixed latency 385 to the end of exposure 364, the trigger signal time can be determined, for example, as follows:

$$T_{trig} = T_{samp} - T_{triglatency} - \frac{T_{shutter}}{2} + \frac{T_{exposure}}{2}$$

The offset determination circuit 224A-224B may further utilize a hardware timestamp latency as an input for the offset value calculation. In order to confirm that the camera is sampled when expected, a hardware timestamp can be utilized on the camera sensor frames. In some embodiments, this timestamp can be applied when the first row of the camera is seen by the receiving hardware. Using this hardware timestamp, the offset determination circuit 224A-224B can correct back to the global sampling point. The value of the correction factor may depend on the processing performed by the camera's image signal processor (ISP) before streaming data out to the receiving hardware. To help define this, the hardware timestamp latency can be identified as the time from the end of exposure of the first row to the hardware timestamp being applied.

In one example, it can be assumed that the following variables can be defined:

Ttimestamplatency: Latency from end of exposure of first row to hardware timestamp applied (seconds)

$TISP_R$: ISP row processing time (seconds)

$TISP_F$: ISP frame processing time (seconds)

Ttransport: Transport latency (e.g., mobile industry processor interface (MIPI) readout, flat panel display (FPD)-link, internal field programmable gate array (FPGA) buffering, etc.)

Thwtimestamp: Hardware timestamp (seconds)

Tsamp: Global sampling point

With respect to streaming ISPs, these type of ISPs process each row as it is read out from the camera. The hardware timestamp latency is derived from the ISP processing time and the time utilized to transmit the start of the row to the timestamping element, as shown below:

$$T_{timestamp} = T_{ISP_R} + T_{transport}$$

With respect to frame-based ISPs, these type of ISPs buffer up the entire image internally, process the image, and then begin streaming out data. As such, the hardware timestamp latency can also include the full rolling shutter time, as shown below:

$$T_{timestamplatency} = T_{shutter} + T_{ISP_F} + T_{transport}$$

Having defined the hardware timestamp latency according to the above, the timestamp correction factor can be calculated to get to the global sampling point, as shown below:

$$T_{samp} = T_{hwtimestamp} - T_{timestamplatency} - \frac{T_{exposure}}{2} + \frac{T_{shutter}}{2}$$

Although the above discussion is specific to an example camera sensor, embodiments herein similarly apply to other example sensor systems and can utilize different intrinsic properties to calculate the offset value of those sensor systems.

As previously noted, the data acquisition circuit 222A-222B of FIG. 2 causes the sample acquisition process of the sensor to begin at a time determined by applying the identified offset to the global sampling point, where the time is precisely synchronized to a common time base that applies across all sensor systems 220A-220B of the vehicle 200. This common time base may include any arbitrary external time source, such as global positioning system (GPS), precision time protocol (PTP), generalized precision time protocol (gPTP), network time protocol (NTP), other software time synchronization, other external hardware trigger synchronization, and so on.

In some AVs, there may be multiple time synchronization systems either across multiple generations of AVs, or used to bridge together different technologies from different vendors implemented in the AVs. In embodiments herein, the sensor systems 220A-220B may implement a time synchronization circuit 226A-226B to allow for time synchronization of the sensor systems 220A-220B to any arbitrary external time source, allowing for synchronized hardware events. The time synchronization circuit 226A-226B can receive any arbitrary input time event from any arbitrary time source, and cause the sensor systems 220A-220B to be time synchronized to the specific time source. This allows for utilization of the same circuit across multiple generations of AVs and/or within multiple technology domains in a single AV.

Figure 4:
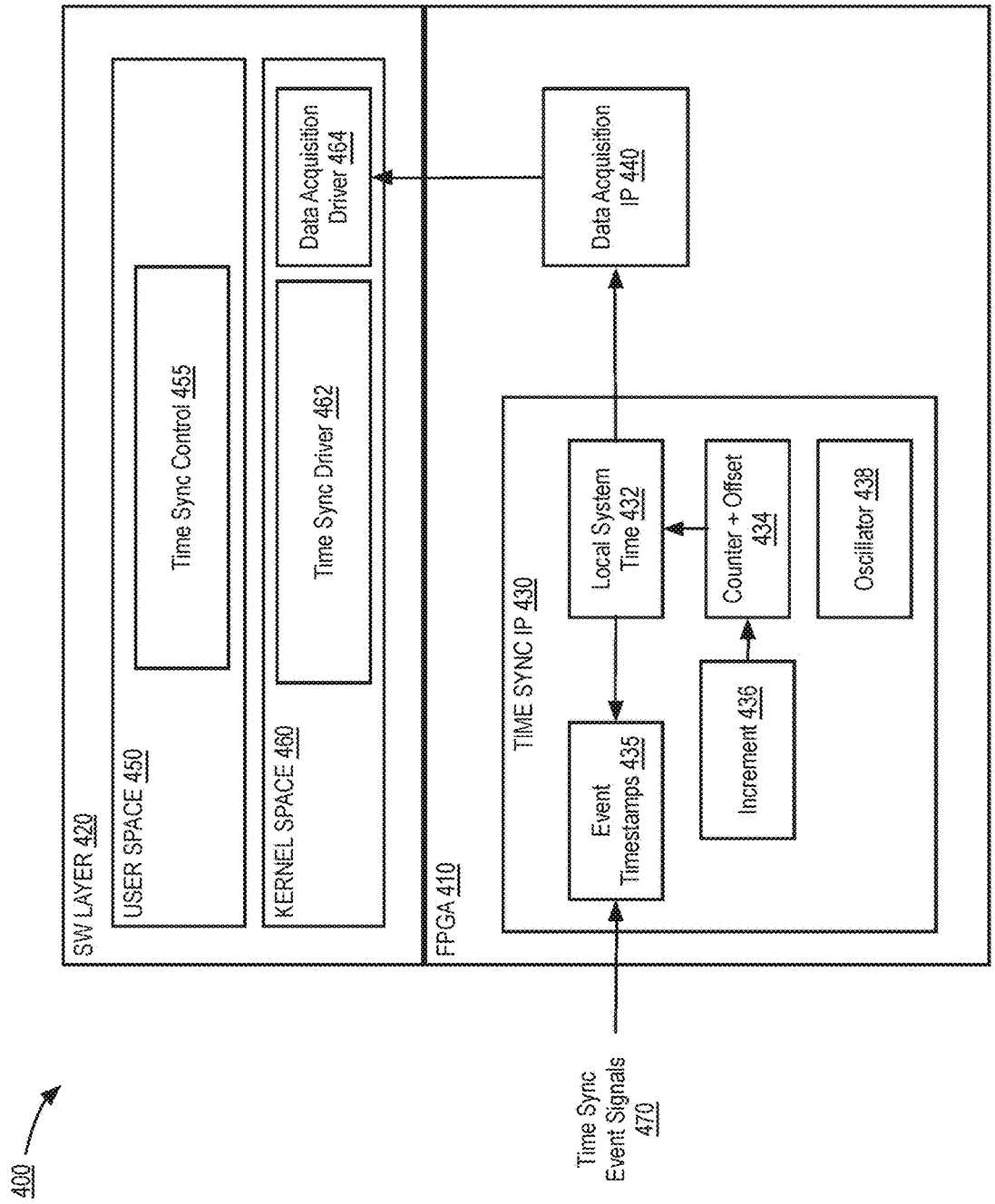
FIG. 4 illustrates a controller circuit of a sensor implementing arbitrary time synchronization as part of a sensor synchronization system for AVs, according to some examples of the disclosure.

FIG. 4 illustrates a controller circuit 400 of a sensor implementing arbitrary time synchronization as part of a sensor synchronization system for AVs, in accordance with embodiments herein. In one embodiment, controller circuit 400, may be part of a sensor 220A-220B described with respect to FIG. 2. More specifically, controller circuit 400 may implement aspects of time synchronization circuit 226A-226B, offset determination circuit 224A-224B, and/or data acquisition circuit 222A-222B described with respect to FIG. 2.

As shown, controller circuit 400 includes an FPGA 410 implementing a software layer 420. The software layer may include user space 450 and kernel space 460 portions. The FPGA 410 may include time synchronization (sync) IP 430 and data acquisition IP 440. One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP" or "IP cores," are reusable units of logic for an integrated circuit that may be stored on a tangible, machine-readable medium as a hardware model that describes the structure of the integrated circuit. Time sync IP 430 and data acquisition IP 440 may include such reusable units of logic for FPGA 410 that may be stored as a hardware model that describes the structure of the FPGA 410.

In one embodiment, the FPGA 410 can provide for nanosecond scale triggering and event timestamping, but may not inherently have a shared concept of time within a larger system. In order to benefit from the precise timing of the sensor synchronization system described herein, the FPGA 410 should be synchronized to a system level time source. As noted above, the system level time source may include any variety of arbitrary external time sources, such as global positioning system (GPS), precision time protocol (PTP), generalized precision time protocol (gPTP), network time protocol (NTP), other software time synchronization, other external hardware trigger synchronization, and so on.

Embodiments herein provide for a combination of components to enable the synchronization of the local system time 432 of FPGA 410 to any arbitrary external system level time source. The components for enabling the synchronization of FPGA 410 are configured to allow for synchronization to any arbitrary time source without being limited to specific time source and/or protocol. As such, the components can be deployed to any sensor system of the AV without modification to handle a specific time source protocol.

The components can include the time sync IP 430, which maintains the local system time 432. The time sync IP 430 provides a software programmable counter and offset 434. The programmable counter can have fractional precision to allow for adjustment of the rate of counting (originating from oscillator 438) in increments of parts-per-billion. The programmable offset allows for shifting of the starting point of the counter without perturbing the rate at which the timer counts up.

The time sync IP 430 also can maintain event timestamps 435. The event timestamps 435 can include a hardware event timestamping system that allows for precise measurement of time at which hardware events 470 occurred (e.g., a gPTP message, a GPS pulse per second (PPS) pulse, etc.). The event timestamps 435 can also include a software event timestamping system that allows for precise measurement of the time at which a software command timing event 470 (e.g., NTP message, PTP message, gPTP message, etc.) is issued.

The components also include a time sync control 455, which may be a software system operating in user space 450 of the software layer 420 that can measure the timing between two arbitrary sets of events maintained in event timestamps 435. Based on these measurements, the time sync control 455 can calculate frequency and offset adjustments (programmed to increment 436 and/or counter and offset 434) to synchronize the local system time 432 of FPGA 410 to a system level time source. In one embodiment, the time sync control 455 can interface with the time sync IP 430 using a time sync driver 462 of the kernel space 460 of software layer 420.

The following discussion provides an example of how the time sync control 455 may calculate the frequency and offset adjustment used to synchronize the local system time 432. Given two clocks, a reference clock R and local FPGA clock F, as monotonically increasing counters, then:

$$T_R(t) = \lambda_R * t$$

and $$T_F(t) = \delta_F * t + C$$

Where $T_R$ refers to the time of the reference clock R, $T_F$ refers to the time of the local FPGA clock, $\lambda_R$ refers to the wavelength of the reference clock (oscillator), t refers to a unit time increment, and where the local FPGA frequency $\delta_F$ can be tuned by adjusting the unit time increment, t, and C is the system time offset. The following can be defined:

$$\dot{T}_R = \frac{T_R(t1) - T_R(t0)}{\Delta t} \quad (1)$$

$$\dot{T}_F = \frac{T_F(t1) - T_F(t0)}{\Delta t} = \delta_0 \quad (2)$$

$$\epsilon = \dot{T}_R - \dot{T}_F \quad (3)$$

Where equation (1) finds $\dot{T}_R$ as the frequency of the reference clock, equation (2) finds $\dot{T}_F$ as the frequency of our local system time update, and equation (3) is the frequency error, where $\dot{T}_R$ is not equal to $\dot{T}_F$. Therefore, we want to find $\dot{T}_F$ such that $\dot{T}_F = \dot{T}_R$. In other words, we need to find a scaling factor, x, that satisfies:

$$\dot{T}_F = \delta_0 * x = \dot{T}_R$$

Using the definitions above, $$x = \frac{\dot{T}_R}{\delta_0} = \frac{\dot{T}_R}{\dot{T}_F} = \frac{\Delta T_R}{\Delta T_F}$$

$$\dot{T}'_F = \delta_0 \left(\frac{\Delta T_R}{\Delta T_F}\right) = \dot{T}_F + \epsilon$$

$$\delta_0 \left(\frac{\Delta T_R}{\Delta T_F}\right) - \dot{T}_F = \epsilon$$

$$\delta_0 \left(\frac{\Delta T_R}{\Delta T_F}\right) - \delta_0 = \epsilon$$

$$\delta_0 \left(\frac{\Delta T_R}{\Delta T_F} - 1\right) = \epsilon$$

$$\delta_0 \left(\frac{\Delta T_R - \Delta T_F}{\Delta T_F}\right) = \epsilon$$

The above provides the frequency error based on the nominal FPGA clock frequency $\delta_0$ and observed measurements. It can be seen from this that the clock drift rate over a given interval is the derivative of the frequency error.

$$\epsilon' = \frac{\Delta T_R - \Delta T_F}{\Delta T_F}$$

The frequency error in parts per billion (PPB) (2nd derivative) can be shown as:

$$\epsilon'_{PBB} = \epsilon' * 10^9$$

The clock slew rate can be adjusted with an increment adjustment in PPB (2nd derivative), as shown below:

$$\ddot{T}'_F = x = \frac{\Delta T_R}{\Delta T_F} = \delta\left(1 + \frac{\delta_{PPB}}{10^9}\right)$$

$$\ddot{T}'_F = \delta_0 + \frac{\delta_0 * \delta_{PPB}}{10^9}$$

In embodiments herein, the synchronized local system time 432 can be used to trigger the data acquisition IP 440 to initiate a data sample acquisition process at the sensor. In some embodiments, the data acquisition IP 440 may interface with a data acquisition driver 464 of the kernel space 460 to cause the acquisition process to begin at the sensor. As a result of the arbitrary time synchronization applied at the sensor as described above, the sample acquisition process of the sensor can begin at a time that is precisely synchronized to a common time base that applies across all sensor systems 220A-220B of the vehicle 200. The sensor may further apply any identified offset to the synchronized time to ensure that the sensor sample is obtained at the global sampling point.

Figure 5:
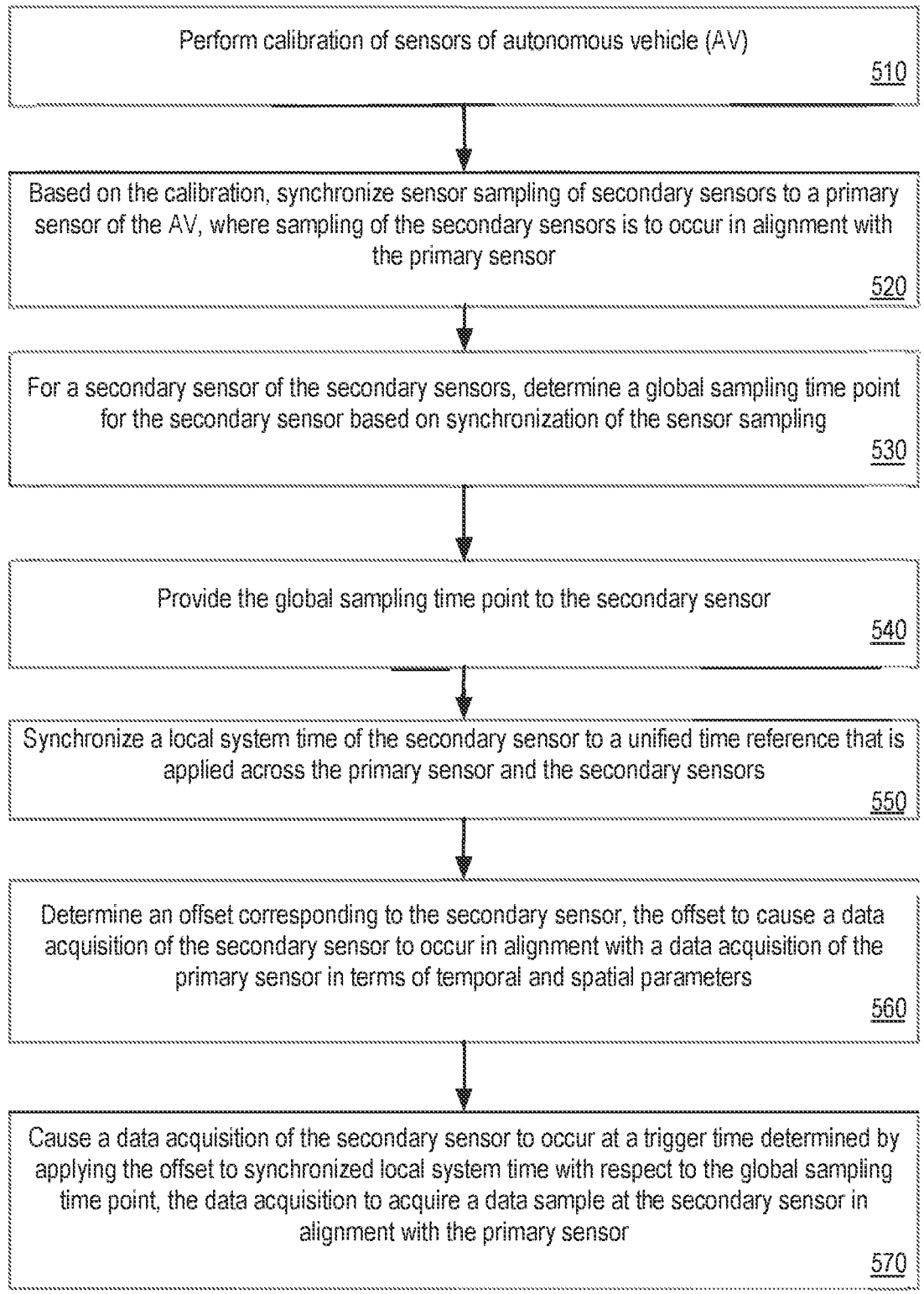
FIG. 5 illustrates an example method for a sensor synchronization system for AVs, according to some examples of the disclosure.

FIG. 5 illustrates an example method 500 for a sensor synchronization system for AVs, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where calibration is performed on sensors of an AV. In one embodiment, a sensor calibration component can perform a calibration process to determine the transformations between the sensor systems and the vehicle. These transformations can be estimated up to a high degree of accuracy. In one embodiment, the calibration process can determine the "extrinsics" of the sensor systems with a high degree of accuracy. The extrinsics refer to the external physical properties of the sensor systems, such as positioning of the sensor systems on the vehicle, e.g., physical mounting angle, etc. In addition, the calibration process can also recover the "intrinsics" of the sensors, e.g., the lens distortion of the cameras, bias in the accelerometer and gyroscope of the IMU, etc. The extrinsics and intrinsics identified during the calibration process may be referred to as calibration parameters.

At block 520, based on the calibration, sensor sampling of secondary sensors is synchronized to a primary sensor of the AV. In one embodiment, the synchronization causes the sampling of the secondary sensors to occur in alignment with the primary sensor. In some embodiments, the primary sensor may be a LIDAR sensor and the secondary sensor can include a camera. At block 530, a global sampling time point is determined for a secondary sensor based on synchronization of the sensor sampling. In one embodiment, the global sampling point is a point in time that sampling of the secondary sensor is aligned with a sample of the primary sensor.

Subsequently, at block 540, the global sampling time point is provided to the secondary sensor. At block 550, a local system time of the secondary sensor is synchronized to a unified time reference that is applied across the primary sensor and the secondary sensors. In one embodiment, the local system time is synchronized using a time synchronization components of the secondary sensor that implement time synchronization using any arbitrary external time synchronization protocol. For example, the time synchronization component described with respect to FIG. 4 and its related description can be utilized to synchronize the local system time of the secondary sensor.

At block 560, an offset is determined for the secondary sensor. In one embodiment, the offset is to cause a data acquisition of the secondary sensor to occur at the sampling time point in alignment with a data acquisition of the primary sensor in terms of temporal and spatial parameters. The offset may be determined based on the intrinsic latencies and properties of the secondary sensor. Lastly, at block 570, the data acquisition of the secondary sensor is caused to occur at a trigger time, where the trigger time is determined by applying the offset to the synchronized local system time with respect to the sampling time point. In one embodiment, the data acquisition is to acquire a data sample at the secondary sensor in alignment with the primary sensor.

Figure 6:
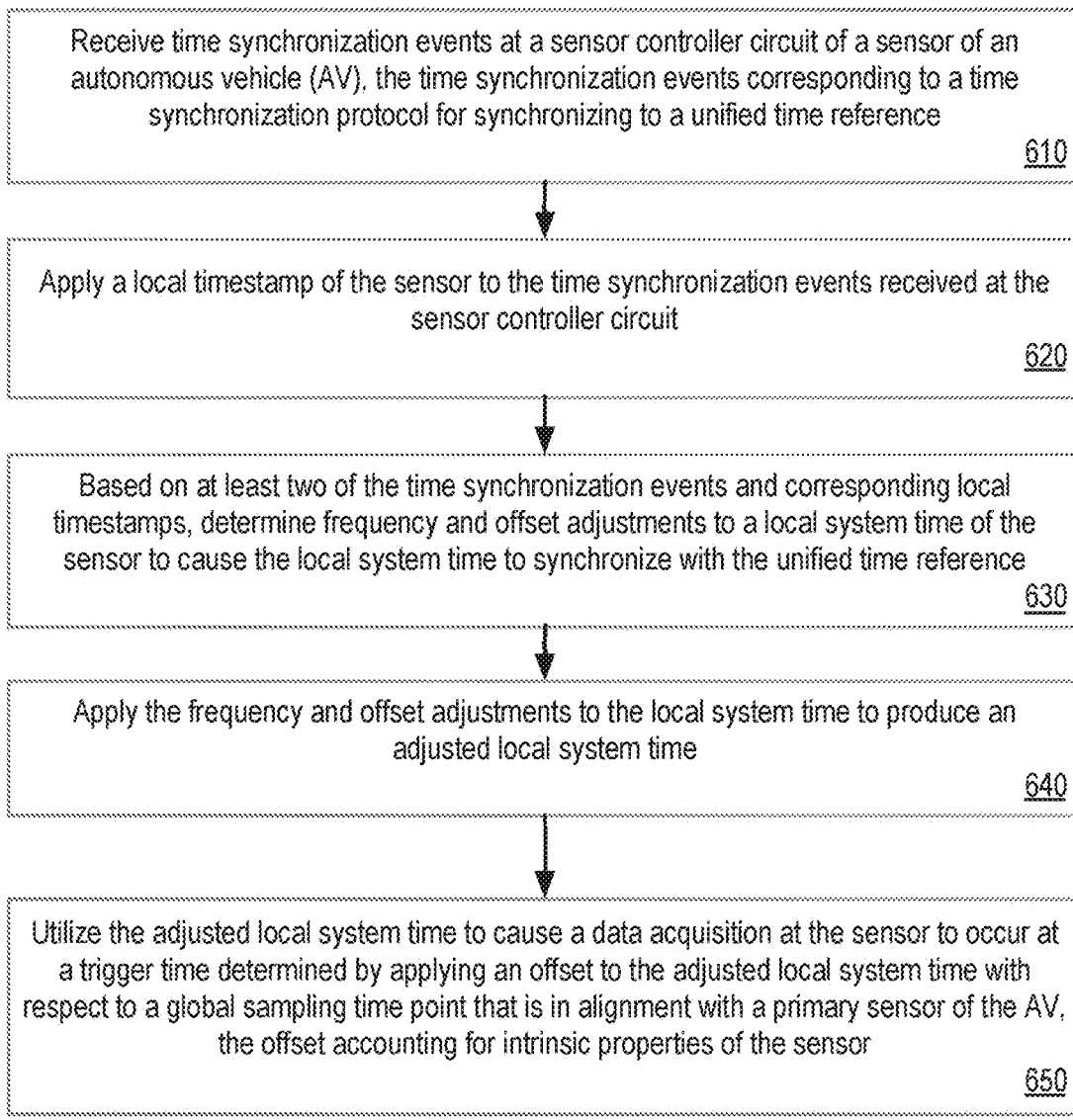
FIG. 6 illustrates an example method for arbitrary time synchronization for a sensor synchronization system of AVs, according to some examples of the disclosure.

FIG. 6 illustrates an example method 600 for arbitrary time synchronization for a sensor synchronization system of AVs, in accordance with embodiments herein. Although the example method 600 depicts a particular sequence of operations, the sequence may be altered without departing from the scope of the disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, the method 600 includes block 610 where time synchronization events are received at a sensor controller circuit of a sensor of an AV. In one embodiment, the time synchronization events correspond to a time synchronization protocol for synchronizing to a unified time reference. The time synchronization protocol can include, but is not limited to, GPS protocol, PTP protocol, gPTP protocol, and/or NTP protocol. At block 620, a local timestamp of the sensor is applied to the time synchronization events received at the sensor controller circuit.

Subsequently, at block 630, frequency and offset adjustments are determined to apply to a local system time of the sensor based on at least two of the time synchronization events and corresponding local timestamps. The frequency and offset adjustment are to cause the local system time to synchronize with the unified time reference. Then, at block 640, the frequency and offset adjustments are applied to the local system time to produce an adjusted local system time.

Lastly, at block 650, the adjusted local system time is utilized to cause a data acquisition to occur at the sensor at a trigger time. In one embodiment, the trigger time is determined by applying an offset to the adjusted local system time with respect to a global sampling time point that is in alignment with a primary sensor of the AV. In one embodiment, the offset accounts for intrinsic properties of the sensor.

Figure 7:
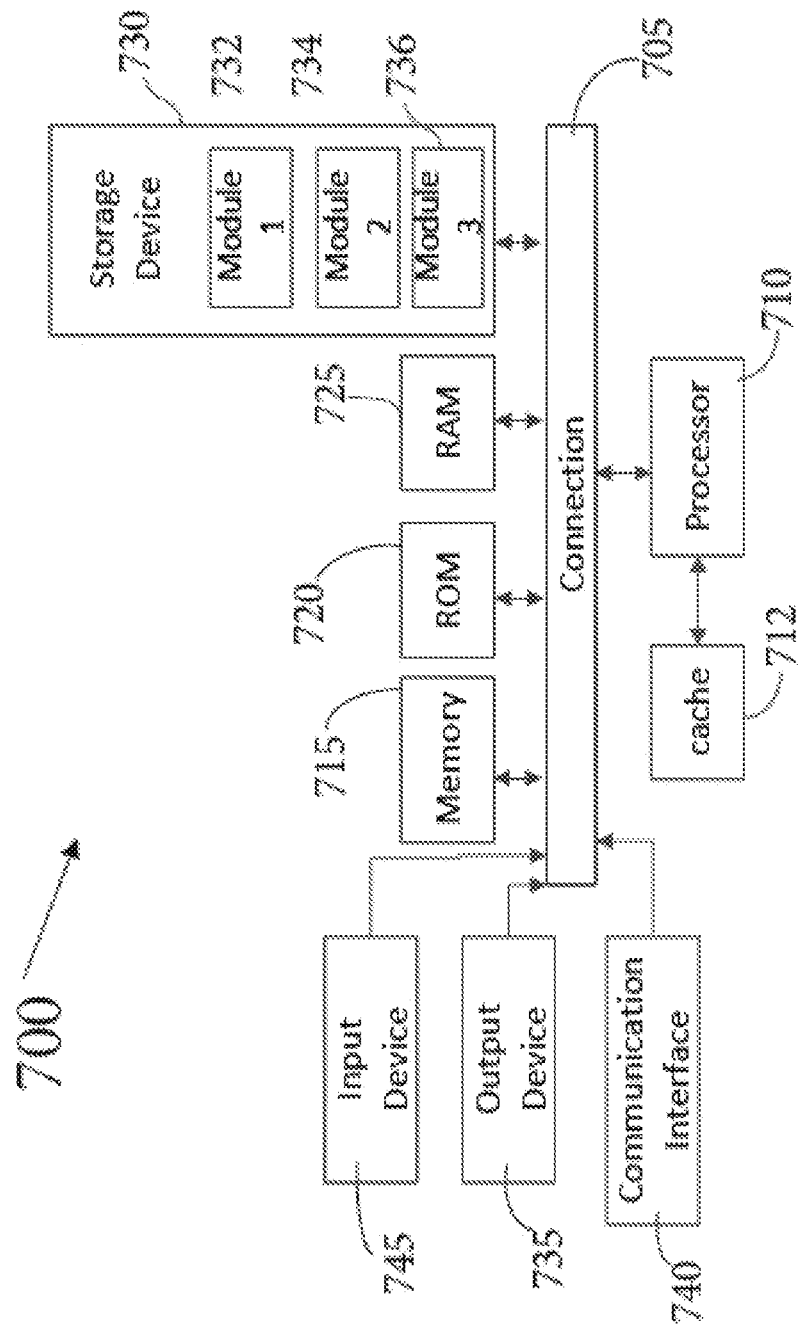
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission of wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method comprising: synchronizing sensors of an autonomous vehicle (AV) to cause sampling of a first sensor of the sensors to occur in alignment with sampling of a second sensor of the sensors; determining a sampling time point for the first sensor based on the synchronizing the sensors, the sampling time point comprising a time when the first sensor is in alignment with the second sensor; providing the sampling time point to the first sensor; determining, at a controller circuit of the first sensor, an offset of the first sensor to apply to a local system time of the first sensor to cause a data acquisition of the first sensor to occur at the sampling time point; and causing the data acquisition to be performed at the first sensor using the sampling time point and the offset.

In Example 2, the subject matter of Example 1 can optionally include wherein synchronizing the sensors is based on a calibration of the sensors that identifies physical locations of the sensors on the AV with respect to each other. In Example 3, the subject matter of any one of Examples 1-2 can optionally include wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

In Example 4, the subject matter of any one of Examples 1-3 can optionally include wherein the first sensor comprises a camera, and wherein the second sensor comprises a LIDAR sensor. In Example 5, the subject matter of any one of Examples 1-4 can optionally include further comprising synchronizing, prior to determining the offset, the local system time of the first sensor to a unified time reference that is applied across each of the sensors.

In Example 6, the subject matter of any one of Examples 1-5 can optionally include wherein synchronizing the local system time further comprises: receiving time synchronization events at the controller circuit of the first sensor, the time synchronization events corresponding to a time synchronization protocol for synchronizing to the unified time reference; applying a local timestamp of the first sensor to the time synchronization events; based on at least two of the time synchronization events and the corresponding local timestamps, determining frequency and offset adjustments to the local system time of the first sensor to cause the local system time to synchronize with the unified time reference; applying the frequency and offset adjustments to the local system time to generate an adjusted local system time; and utilizing the adjusted local system time to cause the data acquisition to be performed at the sampling time point using the offset.

In Example 7, the subject matter of any one of Examples 1-6 can optionally include wherein the time synchronization protocol comprises at least one of a global position system (GPS) protocol, a precision time protocol (PTP) protocol, a generic precision time protocol (gPTP) protocol, or a network time protocol (NTP) protocol. In Example 8, the subject matter of any one of Examples 1-7 can optionally include wherein the sampling time point comprises the time when the first sensor is in alignment with the second sensor in accordance with temporal parameters and spatial parameters of the first sensor and the second sensor. In Example 9, the subject matter of any one of Examples 1-8 can optionally include wherein the data acquisition of the first sensor is to be fused with another data acquisition of the second sensor occurring at the sampling time point.

Example 10 includes an apparatus comprising at least one processor to: synchronize sensors of an autonomous vehicle (AV) to cause sampling of a first sensor of the sensors to occur in alignment with sampling of a second sensor of the sensors; determine a sampling time point for the first sensor based on the synchronizing the sensors, the sampling time point comprising a time when the first sensor is in alignment with the second sensor; provide the sampling time point to the first sensor; determine, at a controller circuit of the first sensor, an offset of the first sensor to apply to a local system time of the first sensor to cause a data acquisition of the first sensor to occur at the sampling time point; and cause the data acquisition to be performed at the first sensor using the sampling time point and the offset.

In Example 11, the subject matter of Example 10 can optionally include wherein the sensors are synchronized based on a calibration of the sensors that identifies physical locations of the sensors on the AV with respect to each other. In Example 12, the subject matter of Examples 10-11 can optionally include wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

In Example 13, the subject matter of Examples 10-12 can optionally include wherein the processor is further to synchronize, prior to determining the offset, the local system time of the first sensor to a unified time reference that is applied across each of the sensors. In Example 14, the subject matter of Examples 10-13 can optionally include wherein the processor to synchronize the local system time further comprises the processor to: receive time synchronization events at the controller circuit of the first sensor, the time synchronization events corresponding to a time synchronization protocol for synchronizing to the unified time reference; apply a local timestamp of the first sensor to the time synchronization events; based on at least two of the time synchronization events and the corresponding local timestamps, determine frequency and offset adjustments to the local system time of the first sensor to cause the local system time to synchronize with the unified time reference; apply the frequency and offset adjustments to the local system time to generate an adjusted local system time; and utilize the adjusted local system time to cause the data acquisition to be performed at the sampling time point using the offset.

In Example 15, the subject matter of Examples 10-14 can optionally include wherein the sampling time point comprises the time when the first sensor is in alignment with the second sensor in accordance with temporal parameters and spatial parameters of the first sensor and the second sensor.

Example 16 is a non-transitory computer-readable storage medium for facilitating a sensor synchronization system. The non-transitory computer-readable storage medium of Example 16 having stored thereon executable computer program instructions that, when executed by one or more processors, cause the one or more processors to: synchronize sensors of an autonomous vehicle (AV) to cause sampling of a first sensor of the sensors to occur in alignment with sampling of a second sensor of the sensors; determine a sampling time point for the first sensor based on the synchronizing the sensors, the sampling time point comprising a time when the first sensor is in alignment with the second sensor; provide the sampling time point to the first sensor; determine, at a controller circuit of the first sensor, an offset of the first sensor to apply to a local system time of the first sensor to cause a data acquisition of the first sensor to occur at the sampling time point; and cause the data acquisition to be performed at the first sensor using the sampling time point and the offset.

In Example 17, the subject matter of Example 16 can optionally include wherein the sensors are synchronized based on a calibration of the sensors that identifies physical locations of the sensors on the AV with respect to each other. In Example 18, the subject matter of Examples 16-17 can optionally include wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

In Example 19, the subject matter of Examples 16-18 can optionally include wherein the one or more processors to synchronize, prior to determining the offset, the local system time of the first sensor to a unified time reference that is applied across each of the sensors comprises the one or more processors to: receive time synchronization events at the controller circuit of the first sensor, the time synchronization events corresponding to a time synchronization protocol for synchronizing to the unified time reference; apply a local timestamp of the first sensor to the time synchronization events; based on at least two of the time synchronization events and the corresponding local timestamps, determine frequency and offset adjustments to the local system time of the first sensor to cause the local system time to synchronize with the unified time reference; apply the frequency and offset adjustments to the local system time to generate an adjusted local system time; and utilize the adjusted local system time to cause the data acquisition to be performed at the sampling time point using the offset.

In Example 20, the subject matter of Examples 16-19 can optionally include wherein the sampling time point comprises the time when the first sensor is in alignment with the second sensor in accordance with temporal parameters and spatial parameters of the first sensor and the second sensor.

Example 21 is a system for facilitating a sensor synchronization system. The system of Example 21 can optionally include a memory to store a block of data, and a processor communicably coupled to the memory, wherein the processor is to: synchronize sensors of an autonomous vehicle (AV) to cause sampling of a first sensor of the sensors to occur in alignment with sampling of a second sensor of the sensors; determine a sampling time point for the first sensor based on the synchronizing the sensors, the sampling time point comprising a time when the first sensor is in alignment with the second sensor; provide the sampling time point to the first sensor; determine, at a controller circuit of the first sensor, an offset of the first sensor to apply to a local system time of the first sensor to cause a data acquisition of the first sensor to occur at the sampling time point; and cause the data acquisition to be performed at the first sensor using the sampling time point and the offset.

In Example 22, the subject matter of Example 21 can optionally include wherein the sensors are synchronized based on a calibration of the sensors that identifies physical locations of the sensors on the AV with respect to each other. In Example 23, the subject matter of Examples 21-22 can optionally include wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

In Example 24, the subject matter of Examples 21-23 can optionally include wherein the processor is further to synchronize, prior to determining the offset, the local system time of the first sensor to a unified time reference that is applied across each of the sensors. In Example 25, the subject matter of Examples 21-24 can optionally include wherein the processor to synchronize the local system time further comprises the processor to: receive time synchronization events at the controller circuit of the first sensor, the time synchronization events corresponding to a time synchronization protocol for synchronizing to the unified time reference; apply a local timestamp of the first sensor to the time synchronization events; based on at least two of the time synchronization events and the corresponding local timestamps, determine frequency and offset adjustments to the local system time of the first sensor to cause the local system time to synchronize with the unified time reference; apply the frequency and offset adjustments to the local system time to generate an adjusted local system time; and utilize the adjusted local system time to cause the data acquisition to be performed at the sampling time point using the offset.

In Example 26, the subject matter of Examples 21-25 can optionally include wherein the sampling time point comprises the time when the first sensor is in alignment with the second sensor in accordance with temporal parameters and spatial parameters of the first sensor and the second sensor.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating a sensor synchronization system, configured to perform the method of any one of Examples 1-9. Specifics in the Examples may be used anywhere in one or more embodiments.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method, comprising:
   synchronizing sensors of an autonomous vehicle (AV) to cause sampling of a first sensor to occur in alignment with sampling of a second sensor of the sensors, wherein the first sensor sweeps horizontally across a field of view of the second sensor and the second sensor includes a rolling shutter that sweeps vertically through N rows of the field of view of the second sensor;
   determining an exposure time for the second sensor indicating a duration of time the second sensor is exposed to a scene, wherein the exposure time is dynamically adjustable between a minimum time duration and a maximum time duration based on an amount of ambient light;
   determining a sampling time point for the first sensor based on a halfway point of an exposure duration that is an average of the minimum time duration and the maximum time duration;
   providing the sampling time point to the first sensor;
   determining, at a controller circuit of the first sensor, an offset of the first sensor to apply to a local system time of the first sensor to cause a data acquisition of the first sensor to occur at the sampling time point; and
   causing the data acquisition to be performed at the first sensor using the sampling time point and the offset.

2. The method of claim 1, wherein synchronizing the sensors is based on a calibration of the sensors that identifies physical locations of the sensors on the AV with respect to each other.

3. The method of claim 1, wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras accelerometers, gyroscopes, inertial measurement units (IMU), infrared sensors, laser rangefinders, ultrasonic sensors, infrasonic sensors, or microphones.

4. The method of claim 3, wherein the first sensor comprises a Lidar sensor, and wherein the second sensor comprises a camera.

5. The method of claim 1, further comprising, prior to determining the offset, synchronizing the local system time of the first sensor to a unified time reference that is applied across each of the sensors.

6. The method of claim 5, wherein synchronizing the local system time further comprises:
   receiving time synchronization events at the controller circuit of the first sensor, the time synchronization events corresponding to a time synchronization protocol for synchronizing to the unified time reference;
   applying a local timestamp of the first sensor to the time synchronization events;
   based on at least two of the time synchronization events and the corresponding local timestamps, determining frequency and offset adjustments to the local system time of the first sensor to cause the local system time to synchronize with the unified time reference;
   applying the frequency and offset adjustments to the local system time to generate an adjusted local system time; and
   utilizing the adjusted local system time to cause the data acquisition to be performed at the sampling time point using the offset.

7. The method of claim 6, wherein the time synchronization protocol comprises at least one of a global position system (GPS) protocol, a precision time protocol (PTP) protocol, a generic precision time protocol (gPTP) protocol, or a network time protocol (NTP) protocol.

8. The method of claim 1, wherein the sampling time point comprises the time when the first sensor is in alignment with the second sensor in accordance with temporal parameters and spatial parameters of the first sensor and the second sensor.

9. The method of claim 1, wherein the data acquisition of the first sensor is to be fused with another data acquisition of the second sensor occurring at the sampling time point.

10. An apparatus, comprising:
    at least one processor to:
    synchronize sensors of an autonomous vehicle (AV) to cause sampling of a first sensor of the sensors to occur in alignment with sampling of a second sensor of the sensors, wherein the first sensor sweeps horizontally across a field of view of the second sensor and the second sensor includes a rolling shutter that sweeps vertically through N rows of the field of view of the second sensor;
    determine an exposure time for the second sensor indicating a duration of time the second sensor is exposed to a scene, wherein the exposure time is dynamically adjustable between a minimum time duration and a maximum time duration based on an amount of ambient light;
    determine a sampling time point for the first sensor based on a halfway point of an exposure duration that is an average of the minimum time duration and the maximum time duration;
    provide the sampling time point to the first sensor;
    determine, at a controller circuit of the first sensor, an offset of the first sensor to apply to a local system time of the first sensor to cause a data acquisition of the first sensor to occur at the sampling time point; and cause the data acquisition to be performed at the first sensor using the sampling time point and the offset.

11. The apparatus of claim 10, wherein the sensors are synchronized based on a calibration of the sensors that identifies physical locations of the sensors on the AV with respect to each other.

12. The apparatus of claim 10, wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

13. The apparatus of claim 10, wherein the processor is further to synchronize, prior to determining the offset, the local system time of the first sensor to a unified time reference that is applied across each of the sensors.

14. The apparatus of claim 13, wherein the processor to synchronize, prior to determining the offset, the local system time further comprises the processor to:
    receive time synchronization events at the controller circuit of the first sensor, the time synchronization events corresponding to a time synchronization protocol for synchronizing to the unified time reference;

apply a local timestamp of the first sensor to the time synchronization events;

based on at least two of the time synchronization events and the corresponding local timestamps, determine frequency and offset adjustments to the local system time of the first sensor to cause the local system time to synchronize with the unified time reference;

apply the frequency and offset adjustments to the local system time to generate an adjusted local system time; and utilize the adjusted local system time to cause the data acquisition to be performed at the sampling time point using the offset.

15. The apparatus of claim 10, wherein the sampling time point comprises the time when the first sensor is in alignment with the second sensor in accordance with temporal parameters and spatial parameters of the first sensor and the second sensor.

16. A non-transitory computer-readable medium having stored thereon instructions that, when executed by one or more processors, cause the one or more processors to:

synchronize sensors of an autonomous vehicle (AV) to cause sampling of a first sensor of the sensors to occur in alignment with sampling of a second sensor of the sensors, wherein the first sensor sweeps horizontally across a field of view of the second sensor and the second sensor includes a rolling shutter that sweeps vertically through N rows of the field of view of the second sensor;

determine an exposure time for the second sensor indicating a duration of time the second sensor is exposed to a scene, wherein the exposure time is dynamically adjustable between a minimum time duration and a maximum time duration based on an amount of ambient light;

determine a sampling time point for the first sensor based on a halfway point of an exposure duration that is an average of the minimum time duration and the maximum time duration;

provide the sampling time point to the first sensor;

determine, at a controller circuit of the first sensor, an offset of the first sensor to apply to a local system time of the first sensor to cause a data acquisition of the first sensor to occur at the sampling time point; and cause the data acquisition to be performed at the first sensor using the sampling time point and the offset.

17. The non-transitory computer-readable medium of claim 16, wherein the sensors are synchronized based on a calibration of the sensors that identifies physical locations of the sensors on the AV with respect to each other.

18. The non-transitory computer-readable medium of claim 16, wherein the sensors comprise at least one of Light Detection and Ranging (LIDAR) sensors, radio detection and ranging (RADAR) sensors, Electromagnetic Detection and Ranging (EmDAR) sensors, Sound Navigation and Ranging (SONAR) sensors, Sound Detection and Ranging (SODAR) sensors, Global Navigation Satellite System (GNSS) receivers including Global Positioning System (GPS) receivers, cameras, accelerometers, gyroscopes, inertial measurement units (IMU), infrared sensors, laser rangefinders, ultrasonic sensors, infrasonic sensors, or microphones.

19. The non-transitory computer-readable medium of claim 16, wherein the one or more processors to synchronize, prior to determining the offset, the local system time of the first sensor to a unified time reference that is applied across each of the sensors comprises the one or more processors to:

receive time synchronization events at the controller circuit of the first sensor, the time synchronization events corresponding to a time synchronization protocol for synchronizing to the unified time reference;

apply a local timestamp of the first sensor to the time synchronization events;

based on at least two of the time synchronization events and the corresponding local timestamps, determine frequency and offset adjustments to the local system time of the first sensor to cause the local system time to synchronize with the unified time reference;

apply the frequency and offset adjustments to the local system time to generate an adjusted local system time; and utilize the adjusted local system time to cause the data acquisition to be performed at the sampling time point using the offset.

20. The non-transitory computer-readable medium of claim 16, wherein the sampling time point comprises the time when the first sensor is in alignment with the second sensor in accordance with temporal parameters and spatial parameters of the first sensor and the second sensor.

* * * * *